United States Patent
Lyle et al.

(10) Patent No.: US 12,432,201 B1
(45) Date of Patent: Sep. 30, 2025

(54) HAPTIC FEEDBACK-BASED VIDEO AUTHENTICATION METHOD AND SYSTEM

(71) Applicant: UIPCO, LLC, San Antonio, TX (US)

(72) Inventors: Ruthie D. Lyle, Durham, NC (US); Snehal Desai, Richardson, TX (US); David Joaquin Harris, San Antonio, TX (US); Eric David Schroeder, San Antonio, TX (US); Jeffrey David Calusinski, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 554 days.

(21) Appl. No.: 17/822,176

(22) Filed: Aug. 25, 2022

Related U.S. Application Data (60) Provisional application No. 63/238,998, filed on Aug. 31, 2021.

(51) Int. Cl.
*H04L 9/40* (2022.01)
(52) U.S. Cl.
CPC ...... *H04L 63/0853* (2013.01); *G06F 2218/12* (2023.01)
(58) Field of Classification Search
CPC .................. G06F 2221/2133; G06F 2218/12
See application file for complete search history.

(56) References Cited

U.S. PATENT DOCUMENTS

| | | | |
|---|---|---|---|
| 9,706,404 B2 * | 7/2017 | Bansal | H04W 12/06 |
| 11,546,390 B1 * | 1/2023 | Boodaei | H04N 7/15 |
| 2009/0307775 A1 * | 12/2009 | Brown | H04L 63/1408 726/23 |
| 2013/0036342 A1 * | 2/2013 | Deo | G06Q 30/02 715/202 |
| 2015/0319153 A1 * | 11/2015 | Tartz | G06F 21/36 726/4 |
| 2015/0341416 A1 * | 11/2015 | Chung | H04W 4/60 715/738 |
| 2015/0352451 A1 * | 12/2015 | Brenden | H04N 21/4122 463/31 |
| 2017/0090569 A1 * | 3/2017 | Levesque | G06F 21/36 |
| 2019/0377963 A1 * | 12/2019 | Hamid | G06V 40/172 |
| 2020/0097643 A1 * | 3/2020 | Uzun | G06V 40/40 |

* cited by examiner

*Primary Examiner* — Hieu T Hoang
(74) *Attorney, Agent, or Firm* — Plumsea Law Group, LLC (57) ABSTRACT

A remote haptic signal-based method and system of performing an authentication of video of a person in order to authorize access to a secured resource. The system and method are configured to cause a remote computing device to generate a vibration while collecting sensor data from the same device. The sensor data is evaluated to determine whether the appropriate motion response from the remote computing device is present. If the response is present, the system determines the image is authentic and can verify an identity of the person, and can further be configured to automatically grant the person access to one or more services, features, or information for which he or she is authorized.

20 Claims, 7 Drawing Sheets

HAPTIC FEEDBACK-BASED VIDEO AUTHENTICATION METHOD AND SYSTEM

CROSS-REFERENCE TO RELATED APPLICATION

This application claims the benefit of U.S. Provisional Patent Application Ser. No. 63/238,998 filed on Aug. 31, 2021 and titled "Haptic Feedback-Based Video Authentication Method and System", the disclosure of which is incorporated by reference in its entirety.

TECHNICAL FIELD

The present disclosure generally relates to identity authentication, and specifically to a method and system for authentication of videos of persons seeking access to one or more secured services, features, and resources. The authentication is based on generation of vibrations in a user device and a synchronized capture of sensor data by the same computing device.

BACKGROUND

Organizations may provide authorized end-users with various secured services or resources via multiple communication channels. Examples of such channels include modes of communication (e.g., a communications network) for exchanging data between devices, where such devices may include, but are not limited to, computing devices, such as tablets, personal computers, and smartphones; point of sale devices; ATMs; connected smart devices, such as refrigerators, watches, and laptops; telephones, such as landline telephones or mobile phones; electronically locked spaces managed by computer user interfaces, such as safe deposit box chambers, lockers, cars, offices, homes; and face-to-face contacts, such as interaction between a user and an employee of the organization. Channels may also include software and firmware associated with the devices and communications devices, such as web portals, applications, networks, mobile applications, and instant messaging systems. Channels may also include hardware associated with the computing devices and telephones, such as the network hardware, credit card scanners, and retinal scanners.

In most scenarios in which an end-user attempts to access a secured resource via one or more of these channels, the end-user will be required to provide some proof of identity, typically associated with an identification card, key-card, fingerprint, or other factor before access is granted. Personal computers (computing devices) pose additional complexities in authenticating users. Computing devices are commonly used by more than one person. It is generally not safe to assume that the identity of the computing device satisfies the ownership factor. Additionally, computing devices have been more easily compromised than other devices. Current solutions increase security, but are often inconvenient for users. More recently, the threat of video forgery (e.g., deep fakes) have increased concern that image data of an end-user may not be authentic.

Thus, authentication (i.e., identifying and verifying) of an end-user can be time-consuming for both the end-user and the organization, as well as burdensome for users who are required to carry and present the necessary identification credentials and/or keys, or memorization of passwords or codes. It may be appreciated that many businesses and other organizations would benefit from mechanisms by which to reduce the costs associated with the authentication and authorization of customers. Furthermore, customers will be attracted by an authentication system that reduces or even eliminates the need to carry or remember multiple unique identification factors, as well as a system that significantly improves account security.

There is a need in the art for a system and method that addresses the shortcomings discussed above.

SUMMARY

In one aspect, a method of verifying an authenticity of images in order to protect user resources. The method includes a first step of receiving, at a cloud-based authentication system and from a first computing device, a request to access a secured resource of a first user while video is streaming from the first computing device to the authentication system. The method also includes a second step of accessing, in response to the request, a first haptic pattern from a pattern repository of the authentication system, the first haptic pattern being associated with a first haptic response that should be detected when a computing device generates a vibration output based on the first haptic pattern. A third step includes transmitting, from the authentication system and in response to the request, a first control signal to the first computing device, the first control signal including the first haptic pattern. Furthermore, a fourth step includes obtaining, at the authentication system, first sensor data captured by a motion sensor of the first computing device while the vibration output based on the first haptic pattern via the first computing device was to have occurred, and a fifth step includes determining, at the authentication system, that the first sensor data includes a second haptic response that is sufficiently similar to the first haptic response so as to be classified as a match. In addition, a sixth step includes verifying, in response to responses matching, an authenticity of the video, and a seventh step involves granting the first user access to the secured resource for which the first user is authorized.

In another aspect, a method for detecting fraudulent attempts to obtain access to secure user data using image data is disclosed. The method includes a first step of receiving, at a cloud-based authentication system and from a first computing device, a request to access a secured resource of a first user while video is streaming from a camera from the first computing device to the authentication system, and a second step of accessing, in response to the request, a first haptic pattern from a pattern repository of the authentication system, the first haptic pattern being associated with a first haptic response that should be detected when a computing device generates a vibration output based on the first haptic pattern. A third step includes transmitting, from the authentication system and in response to the request, a first control signal to the first computing device, the first control signal including the first haptic pattern, and a fourth step includes obtaining, at the authentication system, first sensor data captured by a motion sensor of the first computing device while the vibration output based on the first haptic pattern via the first computing device was to have occurred. A fifth step includes determining, at the authentication system, that the first sensor data fails to include a response that matches the first haptic response, a sixth step includes determining, in response to the first sensor data failing to include a matching pattern, that there is a high likelihood of the request originating from a fraudulent source, and a seventh step includes denying the request and blocking access to the secured resource.

In another aspect, a system for verifying an authenticity of images in order to protect user resources includes a processor and machine-readable media. The machine-readable media include instructions which, when executed by the processor, cause the processor to receive, at a cloud-based authentication system and from a first computing device, a request to access a secured resource of a first user while video is streaming from the first computing device to the authentication system, and to access, in response to the request, a first haptic pattern from a pattern repository of the authentication system, the first haptic pattern being associated with a first haptic response that should be detected when a computing device generates a vibration output based on the first haptic pattern. The instructions further cause the processor to transmit, from the authentication system and in response to the request, a first control signal to the first computing device, the first control signal including the first haptic pattern, and obtain, at the authentication system, first sensor data captured by a motion sensor of the first computing device while the vibration output based on the first haptic pattern via the first computing device was to have occurred. In addition, the instructions cause the processor to determine, at the authentication system, that the first sensor data includes a second haptic response that is sufficiently similar to the first haptic response so as to be classified as a match, verify, in response to the responses matching, an authenticity of the video, and thereby grant the first user access to the secured resource for which the first user is authorized.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

The embodiments provide a method and system of authenticating user videos and other streaming image data in a more secure and more efficient manner by remotely triggering a vibration at a user device and monitoring the device's activity. As described in greater detail below, an authentication process and system based on vibrations caused at a known user device may be utilized for reducing and in some cases eliminating the need for users to present credentials, input passwords, or otherwise offer identity tokens or factors, as well as curtail the use of video forgery to fraudulently access secured resources such as a user's private account. The proposed system takes advantage of an increasing reliance on teleconferencing and the growing availability of image and motion sensors within computing devices in the day-to-day life of the modern consumer.

More specifically, the proposed system contemplates the use of a remote signal to cause a user computing device to briefly generate haptic (vibratory) movement of the user computing device while sensor data of the device is recorded. This can occur, for example, during a video session with a customer representative via the user device, while the user holds the device in their hand. In some cases, the representative may manually initiate the transmission of the remote-control signal. In one example, the device and the user's hand may be modeled as a spring/mass system. The authentication system could monitor how the phone/hand system responds to haptic feedback (e.g., when the phone is vibrated) using acceleration sensors in the device. In some embodiments, the system can be configured to confirm, based on image data obtained during the vibration, that the phone/hand system moved when the haptic feedback signal was sent. In other embodiments, features such as the vibration frequency of the phone/hand system could be measured and compared to known baselines for authentication.

In different embodiments, such an approach can be advantageous in combating the growing threat of video forgery. Deep fake algorithms in particular are becoming increasingly sophisticated. By generating a face through a deep learning neural network, such algorithms are able to replace a real face with an imposter fake face in real time. Such algorithms can be implemented using both Artificial Intelligence (AI) and Machine Learning (ML) to 'trick' a secured system into releasing confidential information. While existing technologies allow digital watermarks to be added to images, videos, and audio files or streams to ensure the authenticity of distributed media, the use of such technologies is typically controlled by producers of the media rather than by a speaker within a video. As will be discussed below, the proposed systems can further be configured to verify a user's identity with minimal user effort and offer a simplified, efficient, and ultimately highly convenient process by which to authorize and grant the user access to secured resources. Such systems can rely on device infrastructure that is already in place for video, image, and motion recording, making it simple to deploy at a low cost.

References to various aspects of access management will be discussed throughout the following disclosure, including identification, authentication, and authorization. For purposes of this application, the term 'identification' refers to the process of associating a user with something that has occurred on a server, on a network, or with some other resource, and typically occurs when a user (or any subject) claims or professes an identity. Traditionally, the process of identification can be accomplished with a username, a process ID, a smart card, or anything else that can uniquely identify a subject. In addition, the term authentication refers to the process of proving (or verifying) an identity or source of identity, and typically occurs when subjects provide appropriate credentials to prove their identity. For example, when a user provides the correct password with a username, the password proves that the user is the owner of the username. Thus, the authentication provides proof of a claimed identity. In the embodiments described herein, authentication of an image based on the detection of a specific output in the image can be used to prove the user is the owner of the username. As a general matter, three main methods of authentication include (a) user knowledge, such as a password or PIN; (b) user possession, typically provided by the secured system, such as a key, smart card, CAC (Common Access Card), PIV card (Personal Identity Verification card), RSA, or other card or token, magnetic stripe cards, certificates with a digital signature, computing device that is configured to receive a control signal, etc.; and (c) biometric factors, such as voice recognition, facial recognition, retinal and fingerprint scans, etc.

Authorization refers to the concept of allowing access to resources only to those permitted to use them. In other words, authorization is a process that protects resources by only allowing access by consumers that have been granted authority to use or receive them. Some examples of such resources include individual files' or items' data, computer programs, computer devices and functionality provided by computer applications, as well as more tangible resources such as ATMs, banks, vaults, offices, or other spaces with specific security requirements. In addition, the use of the term "secured resources" refers to services, features, or other resources (physical and digital or virtual) that are access-restricted and are designed to be made available only to users that have been authenticated and authorized for such access. The term "passive" refers to the concept of a system and method that is not dependent on any particular 'active' interaction of a person with a device resulting from a change in the person's normal activity or behavior and/or do not require the user to remember anything. In other words, walking and moving their body from one location to another, as well as more fine motor movements (e.g., adjusting the position of their arm or a change in facial expression) are passive interactions, as the person could perform these activities regardless of the authentication system that is in place. However, other user actions, such as but not limited to providing a passcode, pre-registered security question answers, etc. are active inputs and a system requiring any of these types of information would not be considered passive. In addition, this type of arrangement-relying on a particular pattern to occur in the user device in response to a remote control signal-precludes the need to previously record and store any biometric data (e.g., retinal scan, fingerprint scan, voiceprint, etc.) for the user, which some users are uncomfortable doing.

Organizations and businesses often provide support to customers by making available to their customers one or more member service representatives (MSRs) or other customer representatives and service agents (referred to generally herein as "agents") who have access to networked computers, telephones, often networked to a larger corporate computer network, including mainframes, microcomputers and LANs. For example, voice and data pathways into the center can be linked through routing servers and computer telephony integration (CTI). In some cases, CTI also facilitates interfaces with customer support servers in addition to any e-mail system, databases and web-based services. A customer may contact or be contacted by an MSR to learn more about a service or product, obtain guidance, or purchase various items. Implementations of the proposed systems and methods may also include interactions with an agent, virtual or human, of a secured system. This service representative or agent is stationed at a location that is remote relative to the customer's location, such as a call center. As used herein, the term "customer" or "user" should be understood to refer to any end-user or person requesting or receiving assistance or other communications from a secured system, including via a communication session with a remote agent, whether human or virtual/artificial. The customer can typically view at least one aspect of the interaction through a display of their computing device.

It may be appreciated that conventional methods of authentication rely heavily on identification documents or other tangible items provided by the system administrators that users are required to carry on their person and present when prompted, and/or intangible factors such as memorized passcodes or security questions and answers. However, such tokens have significant shortcomings. For example, they can be lost, stolen, or forged. In many cases, an individual may need to carry multiple identification cards or tokens, which may be unwieldy. Furthermore, less tangible factors can be burdensome, requiring memorization or physical contact or a particular physical position or proximity with a device. The following systems describe a process of authentication that does not rely on such factors, and serves as a barrier to deep fake imposter attacks.

Figure 1:
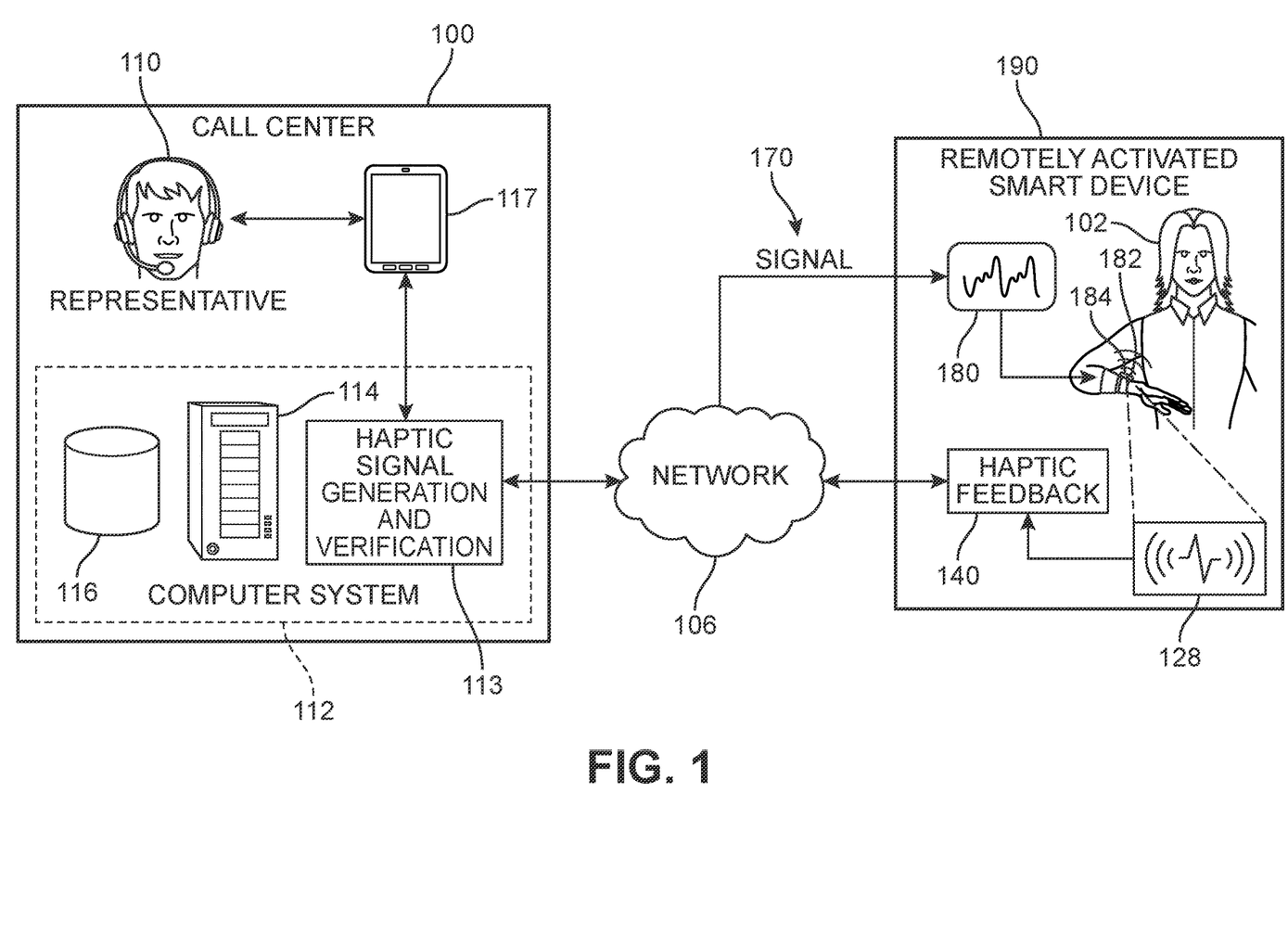
FIG. 1 is an overview of a scenario in which a computing device provides haptic-based data in response to a remote signaling event in order to obtain access to a secured resource, according to an embodiment.

For purposes of introduction, an overview of one embodiment of the proposed systems and methods is illustrated with reference to FIG. 1. In FIG. 1, an example of an authentication process is shown in which a first user 102, in a first location 190, is on a call with a representative 110 who is at a call center 100, or otherwise in a remote location relative to the first user 102. The first user 102 is conversing with representative 110 in order to be authenticated and then obtain access to their account or other secured resource. In different embodiments, first user 102 can participate in the communication session via a telephone or a computing device configured with a network connection and connected to a camera or other image sensor, depending on the mechanism utilized for data transmission.

In some embodiments, first user 102 may have access to a user computing device ("user device") 182 through which the communication session occurs. The device can include a tablet, a laptop, a smartphone, a desktop computer, a smart device, or similar kind of device that allows user 102 to contact call center 100. For purposes of this example, the first customer 102 has just been connected to representative 110 and is seeking access to their account details via a smartwatch device.

In different embodiments, the user device 182 can include an electronics unit comprising a plurality of different components, such as one or more of various user interface components (e.g., a touchscreen display, keyboard, mouse, microphone, camera, speaker, etc.), a user interface module, a processor, and/or a communication module. These devices may include a system including one or more processors and memory. Memory may comprise a non-transitory computer readable medium. Instructions stored within memory may be executed by the one or more processors. The user device 182 may be configured to receive and analyze data from various input sensors associated the device or data that is communicated from external components or devices to the device. In some cases, the user device 182 may also include a navigation system equipped with a GPS receiver that can receive GPS information or other receivers capable of receiving global or local positioning information. In addition, in different embodiments, the user device 182 can include one or more types of a device, module, machine, or subsystem whose purpose is to detect events or changes in its position and environment, as will be discussed below.

A communication module may allow the user device 182 to communicate wirelessly. In this case, the communication module is illustrated as a wireless connection; however, wired connections may also be used. For example, the communication module may include a wired serial bus such as a universal serial bus or a parallel bus, among other connections. The communication module may also include a wireless connection using Bluetooth® radio technology, communication protocols described in IEEE 802.11 (including any IEEE 802.11 revisions), Cellular technology (such as GSM, CDMA, UMTS, EV-DO, WiMAX, or LTE), or Zigbee® technology, among other possibilities.

In different embodiments, the user device 182 may include a device display ("display") 184 that can, for example, present information and various media for a product/service support software application ("app"). In some embodiments, the app is associated with the provider of the product/service for which the service representative is offering support. In some embodiments, the first user 102 can receive and send information through a user interface that may be presented on a display for the device. In some embodiments, the display may be a touchscreen, allowing the customer to interact with the user interface directly by touch. The user interface may refer to an operating system user interface or the interface of one or more software applications that may run on the user device 182. In some embodiments, the user interface can include a messaging window or other chat-space by which the service representative may send messages or other digital content. Alternatively, in some embodiments, the first user 102 can also speak with the service representative via a voice calling application on user device 182, or directly through a telephone or other external device.

In an example embodiment, customer service call center 100 includes at least one computer system 114. The term "computer system" refers to the computing resources of a single computer, the partial computing resources of a single computer, a plurality of computers communicating with one another, or a network of remote servers. In one embodiment, computer system 114 includes at least one server having at least one processor.

In different embodiments, computer system 114 includes one or more computing devices (for example, a server) that may be in communication with one or more databases 116. Databases could be co-located with computing devices or could be remote databases that are accessible by computing devices over a network. Databases can include any kind of storage devices, including but not limited magnetic, optical, magneto-optical, and/or memory, including volatile memory and non-volatile memory. In an example embodiment, computer system 114 may also include or be configured with access to an access management platform (see FIGS. 2A and 2B), of which a motion verification module ("verification module") is a component. In some embodiments, the verification module may be implemented in software, hardware, or a combination thereof.

In different embodiments, while the first user 102 is communicating with representative 110, the access management system can be configured to verify an identify of a person so as to either permit or deny access to the user-identity dependent services. As used herein, the term "user" or "member" or "account holder" should be understood to refer to any end-user or person requesting or receiving assistance or other communications from a support agent or service representative. It should be understood that while the following description presents a sequence illustrating the use of the proposed systems and methods in a customer-agent dynamic, in other embodiments, the proposed systems may be utilized by a broad range of end-users, including other types of work calls and corporate calls, or other instances in which access is dependent on video interaction or a detection of video forgery is needed.

In some embodiments, representative 110 may have access to a device of computer system 112. In one embodiment, representative 110 may have access to a representative device 117. In FIG. 1, representative device 117 is depicted as a mobile computing device, such as a smartphone or tablet computer. In other embodiments, representative device 117 could be a desktop computer, a laptop computer or any other kind of computing device. Using representative device 117, representative 110 may be able to review customer records, send documents and forms to a customer, provide access to a secured resource, and/or perform other tasks required to help a customer calling in to call center 100.

In some embodiments, both representative device 117 and user device 182 may be computer systems for processing and communicating information. Each device may generally include a processor, a data storage component, and a display. Each device may also include components to facilitate communication with external systems (for example, hardware and software components to enable communication over a network). In some cases, a device may include one or more input devices, such as a keyboard, mouse, and/or one or more physical buttons integrated into a case of the device. In other cases, a device may further include touchscreen controls and inputs.

In one embodiment, user device 182 could operate in a client-server relationship with one or more servers of computer system 112. For example, computer system 112 may include a server that communicates with user device 182, as well as other remote devices (e.g., user devices of other customers) over a network 106. The user device 182 may provide the front-end of a system that provides users with options for performing various kinds of tasks (for example, making fund transfers when the company is a bank). In some cases, user device 182 may run client software through a web browser, in which case the client software may be hosted on a server associated with computer system 112. In other cases, user device 182 may run client software in the form of a native software application that has been downloaded through a centralized marketplace (i.e., an "app store"). In some cases, while the client software that allows users to perform various tasks may be run on user device 182, the data may be retrieved from and stored on databases associated with computer system 112 (e.g., databases 116).

During the call between representative 110 and first user 102, the first user 130 requests access to an account or other secured resource of the first user. In response, in different embodiments, the remote access management system can automatically, or at the manual request of the service representative, initiate an authentication procedure, action, or task that includes a remote signaling event. As a general matter, a remote signaling event refers to the process and period during which the authentication system issues a control signal to a remote user device over a network, and the control signal causes the user device to visibly respond, via an internal vibration motor.

In different embodiments, the access management system, through control signal module 113, can then generate one or more signals 170 that are transmitted over network 106. The signals 170 can, for example, include a specific haptic signal, as well as a request to the user device 182 to generate or produce the haptic signal at a specific time. The signals 170 are received by the user device 182 that is known to be associated with the first user (e.g., based on a previous device registration session) as a haptic control signal 180 that causes the user device 182 to produce a particular output. In FIG. 1, in response to the signals 170, the user device 182 produces a vibration pattern 128 that is based on the haptic data transmitted by the control signal module 113. Some non-limiting examples of such haptic (vibration) patterns can include a sequence of vibrations occurring within a few seconds, with the duration of each vibration and time between vibrations comprising the pattern, and/or a sequence of changes in intensity of the vibrations, etc.

At or around the same time, in a different but synchronized remote signaling event, the control signal module 113 also generates a control signal that requests or triggers a capture of a sample of sensor data 140 by a sensor of (or connected to) the user device 182. In some embodiments, the sensor data 140 is a segment taken from a video stream received during the communications session showing the video becoming jarred or unstable as the vibration(s) occurred. In another example, an accelerometer or gyroscope can capture motion data. This sensor data 140 is then transmitted to and received by the remote access management system via network 106.

Based on the received sensor data 140, the system will determine whether to authenticate the user for access to the secured resource. For example, the control signal module 113 can process and analyze sensor data 140 and determine whether the sensor data 140 includes a motion record of the pattern that was sent to the user device 182. If the expected pattern is detected in the sensor data 140, the authenticity of the video or image can be verified, providing an additional layer of veracity to the user's identity. In this example, sensor data 140 does include a record of the expected motion, and the system automatically communicates this information to the service representative. Thus, in FIG. 1, without further action or presentation of credentials by first user 102, the communication session can proceed with permitting first user 102 access to the account linked to the authenticated identity of the first user 102. The first user 102 is then able to make account requests and/or receive sensitive account information.

While in some embodiments the system may incorporate additional layers of authentication that may supplement the authentication process, such as facial recognition, voice recognition, fingerprint recognition, password or pin-code verification, or other such factors, it may be appreciated that the system can be readily implemented without such additional steps. In other words, the first user 102 is able to obtain access to the desired secured resources without an identification card, debit card, or other system-provided token typically presented for such occasions. The system thereby allows the user to be passively (i.e., 'touchlessly') authenticated. In some embodiments, the system is further configured to automatically provide the user with access to the secured service linked to the user's unique account, in response to the authentication that is performed based only or primarily on the sensor capture of the haptic pattern.

Figure 2A:
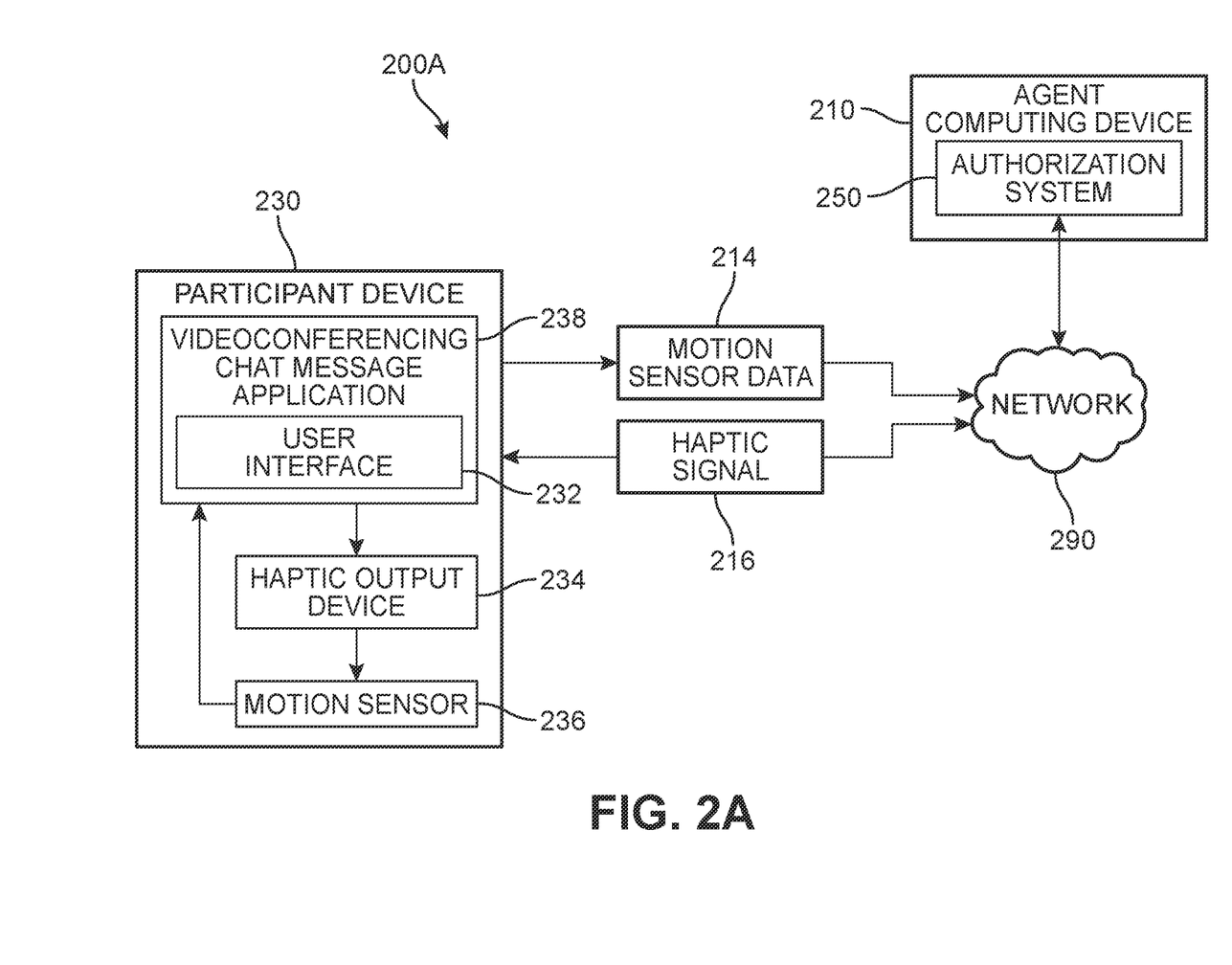
FIGS. 2A and 2B are an overview of an environment of a remote generation of haptic output for purposes of authentication, according to an embodiment.
Figure 2B:
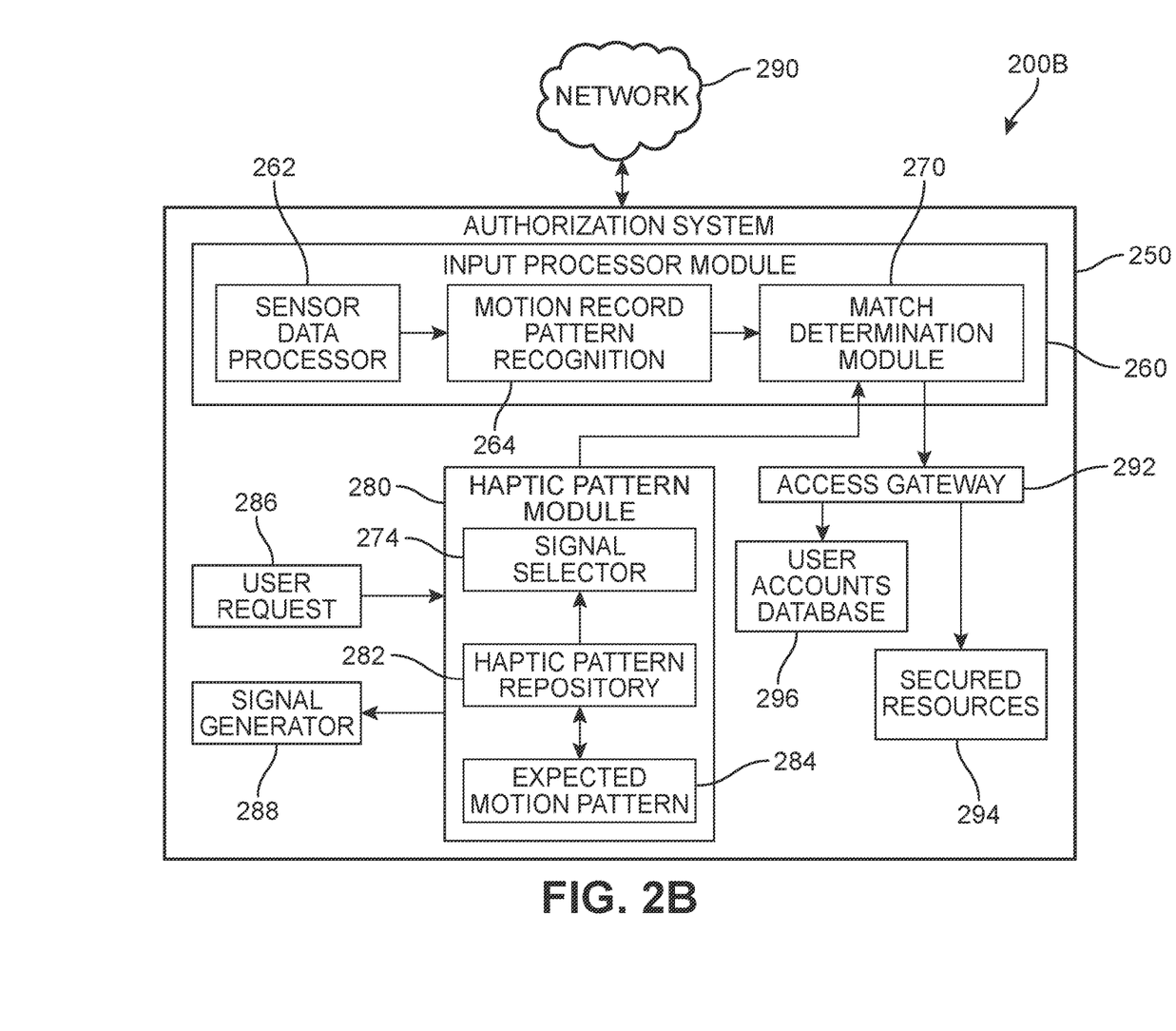

In order to provide the reader with a greater appreciation of the embodiments, FIGS. 2A and 2B depict an overview of an embodiment of an environment 200A and 200B of an access management system architecture in which user device haptic-based data is captured and used to determine an authenticity of the video. The two figures are separated for purposes of clarity, such that the two drawings represent a single diagram. It should be understood that the environment (200A, 200B), collectively referred to as environment 200, is presented is for purposes of illustration only, and other embodiments may utilize different or additional components or processes. The environment 200 may alternatively include additional, fewer, or different components. For example, the environment 200 may include additional storage devices, additional servers, additional computing devices, and other features not shown in FIGS. 2A and 2B.

As shown in FIG. 2A, the environment 200 includes a participant computing device ("participant device") 230 that is configured to communicate with an agent computing device ("agent device") 210, for example via a Wi-Fi, cellular, or other network connections 290. The networks 290 may comprise any number of electronic devices and use any number of communication protocols to facilitate data communications within the network 290. One having skill in the art would appreciate that the network 290 may include a variety of internal and/or external networks 290 of various types implementing various data communications technologies. The communication over the network may be performed in accordance with various communication protocols such as Transmission Control Protocol and Internet Protocol (TCP/IP), User Datagram Protocol (UDP), and IEEE communication protocols. The networks 290 can include a wireless (e.g., Wi-Fi, Bluetooth®) or wired data network, a cellular network, a telecommunications network, an enterprise network, an application-specific public network, a Local Area Network (LAN), a Wide Area Network (WAN), WLAN, MAN, a private network, a public network such as the Internet, an ad-hoc network, a network that includes a satellite link, or another type of data communication network. The network 290 may include a physical and/or logical architecture defined by firewalls, proxy servers, routers, switches, or similar features that implement various levels of security and my function as logical gateways or boundaries. While the various components of environment 200 are shown as being accessed through a cloud network and/or stored on a cloud-based server in FIGS. 2A and 2B, in other embodiments some or all components or modules described herein can reside in participant device 230 and/or agent computing device 210.

In different embodiments, the participant device 230 includes a device display ("display") that can present information and media for a product/service, for example via a videoconferencing-chat messaging or other communication application ("app") 238 that can connect the participant with the support agent. For example, a customer can receive and send information through a user interface 232 for app 238 that may be presented on the device display. Although the app 238 is shown as residing on participant device 230 in FIG. 2A, it should be understood that the app 238 can be a web-based application that is accessed from the device via network 290.

The user interface 232 and display may represent a common component or may represent separate physical or functional components. In some embodiments, the display may be a touchscreen, allowing the customer to interact with the user interface directly by touch. The user interface may refer to an operating system user interface or the interface of one or more software applications that may run on the participant device 230. In addition, in some embodiments, when the user launches the app 238 on participant device 230, they may be shown an option to initiate a screen sharing function, whereby content currently being displayed on the participant device 230 is transmitted to the agent computing device 210. In some embodiments, the user interface 216 can include a messaging window or other chat-space by which the support agent may send text messages or other digital content. Alternatively, in some embodiments, the customer can also speak with the support agent via a voice calling application on participant device 230, or directly through a telephone or other external device, such as a cell phone or more general videoconferencing system.

Thus, as a general matter, agent device 210, participant device 230, and the authorization system 250 (see FIG. 2B) can be configured to work in conjunction with the telephony/videoconferencing application ("application" or "app") such as a teleconferencing software application. For example, implementations described herein may be performed via any electronic communications between an agent and a customer including, but not limited to, telephone, video telephone, chat (e.g., IM, Slack™, Jabber™), video chat (e.g., Skype™, MS Teams™, Zoom™, Facetime™), internet based meetings (e.g., WebEx™), custom call-center systems, and other conference call systems. In addition, application can be configured to present various interfaces by which administrator or other users can interact with features of the system 250 (see FIG. 2B). In addition, the app 238 running on participant device 240 can include additional components enabling features by which control signals received from the authorization system may be executed. In other embodiments, the components can be configured as a simple software execution mechanism which receives, translates, and presents output in response to signals transmitted by the authorization system.

Although not shown in FIG. 2A, it should be understood that a virtual or human support agent can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agent can refer to any person or personnel who offers the caller (or person who was called) assistance, and has access to features of the system 250 during the communication session with the customer.

During the communication session between the participant and the agent, control signals may be transmitted from the authorization system that cause a haptic output device 234 and/or motion sensor 236 of the participant device 230 to capture haptic data ("motion senor data") 214 from the participant. The data capture is configured to coincide with the production of a vibratory pattern from the participant device via vibration motor(s) in the participant device 230 in response to a haptic control signal 216 generated and transmitted by the authorization system.

Furthermore, in different embodiments, the participant device 182 can include one or more types of a device, module, machine, or subsystem whose purpose is to detect events or changes in its position and environment and convey the detected information to a sensor data processor 262 (see FIG. 2B). Thus, the participant device 230 can refer to any computing device by which a user can communicate via video and is capable of vibration. Such devices typically include a wide range of mobile computing devices such as smart phones, tablets, smartwatches, smartglasses, PDAs, etc. Some non-limiting examples of sensors that may be used to collect data for the authentication system include (a) cameras and other image and/or light sensors; (b) electrostatic sensors; (c) audio sensors and other sound/volume sensors (e.g., microphones); as well as motion-based sensors such as (d) motion/speed sensors; (e) gyroscopes; (f) accelerometers; (g) tilt sensors; (h) flow and level sensors; and/or (j) magnetometers. In different embodiments, sensors for participant device 230 may collect data regarding location, speed, and direction of the user device and/or the combination of the user device and hand of the user holding the device. For example, the system be configured to treat the combination of hand and device as a spring-mass model, whereby the motion predicted from the hand and device together in response to the specific generated vibration pattern should match the motion sensor data 214 received from the participant device in order for authenticity of the video to be verified.

Referring now also to FIG. 2B, in different embodiments, the authentication system ("system") 250 is configured to receive a user request 286 for access to a secured resource 294 associated with a user account in user account database 296. In different embodiments, the system 250, agent device, and/or participant device may include one or more processors, non-transitory machine-readable storage media, and a data communication interface (e.g., NIC card), as well as user interface devices, for example, a monitor, touchscreen, mouse, or keyboard. These components can be implemented as computing devices or mobile devices, such as smart phones, personal digital assistants (PDAs), portable media players, smart watches, smart glasses, smart jewelry, smart apparel, laptops, notebooks, tablets, and others, and can include work stations, mainframes, non-portable computing systems, devices installed in structures, vehicles, and other types of installations.

In some embodiments, the system 250 is capable of communicating with external devices such as agent device (also referred to herein as an administrator computer) and the participant device through the network 290 using wired or wireless communication capabilities. The system 250 can be understood to comprise a cloud-based server and, along with the agent device, may include computing devices comprising any number of components, such as a Network Interface Card (NIC), allowing the respective devices to receive, transmit, process, and store information obtained from the sensor devices. In other words, the system 250 may include groups or subgroups of computing devices that can communicate with each other, but not necessarily with the computing devices in other groups or subgroups. The system 250 may include computing devices of disparate types, having different types of hardware and software configurations and in a variety of different locations. In some cases, multiple devices or subsystems can be identified together as a single computing device.

In different embodiments, the system 250 includes or is configured to access one or more databases, such as member profile or user accounts database 296, and enable access to secured resources 294. The user accounts database 296 is a content library that stores account data related to one or more users. The data may include, for a plurality of users, name, personal and professional details, current and past policy for the user, credit limit of users, among other details. The database 296 can further include connection information for known (registered) user devices for which the user has authorized and enabled the input and execution of a control signal. In one embodiment, the registry maintains a listing of one or more computing devices for each end-user subscribed to the remote-control signal-based authentication feature. In different embodiments, the database 296 therefore includes a protocol providing communication with the app running on the user's devices. It can be understood that the end-user has also provided consent to the system for remote access and control of each of these registered devices as appropriate for authentication purposes.

As shown in FIGS. 2A and 2B, a signal generator module 288, in communication with a haptic pattern module 280, obtains the selected or designated vibration pattern that will be transmitted to the participant device. In different embodiments, the haptic patterns are stored in and accessed from a haptic pattern repository 282, along with an expected movement or movement pattern response database 284 that includes the reference responses that would correspond to a 'correct' or expected motion record from the participant device sensor(s). The pattern repository 282 includes one or more haptic signals that may be used for verification purposes. These signals may be a few milliseconds to a few seconds in duration. In some embodiments, the signals are configured to cause to the user device to produce a sequence of vibrations. A signal selector module 274 provides a haptic pattern to the signal generator module 288, which then transmits the haptic control signal 216 (see FIG. 2A) that will cause the participant device 230 to present the selected vibration pattern at the appropriate time.

In some embodiments, the participant device includes a GPS receiver that can receive GPS information or other receivers capable of receiving global or local positioning information. The system can be configured to evaluate the user location information and determine which device can serve as target devices for the control signal(s). Once the signal generator module 288 identifies a device associated with the purported user, it may obtain (i.e., at random or following a particular order) a signal pattern for authentication by reference to the haptic pattern module 280.

In different embodiments, the system can include provisions to ensure or otherwise facilitate the capture of output from the participant in response to the presentation of a haptic pattern. In one embodiment, the agent, via agent device, can request (via message or voice) that the user move their face more clearly or fully into the field of view of the camera. In another embodiment, the system can be configured to automatically detect the presence of the user's face during a video session with the user. In one example, the participant's face may be out of range of a field of view of the camera, and the system can automatically present a request to the user to move into the field of view of the camera. In one embodiment, the system will show the user, on a display for the participant device, the image data being recorded so that the user can move to accommodate the view of the camera.

Referring to both FIGS. 2A and 2B, once a pattern has been obtained from pattern module 280, the signal generator module 288 is configured to issue the haptic control signal 216 to participant device 230. The signal can include information enabling the system to communicate with the participant device 230, as well as provide the selected haptic signal to the device over network 290. Thus, when a user requests access to a secured resource, for example via a user interface presented on participant device 230 over network 290, the control signal 216 may be generated by system 250, causing a production of the signal via the haptic output device 234 for the participant device 230.

Furthermore, in some embodiments, system 250 is configured to cause participant device 230 to send motion sensor data 214 to remote components such as the system 250 and/or the agent device 210. Thus, in some embodiments, a sensor control signal is configured to cause one or more motion-based sensors (e.g., accelerometer, gyroscope, etc. as noted earlier) of the participant device 230 to record motion data during a period of time overlapping with the scheduled output of the pattern from the haptic output device 234 of participant device 230. This ensures that the sensor data is collected when the vibration pattern is being produced.

In different embodiments, motion sensor data 214 can be received by an input processor module 260 of the authorization system 250. In one example, the sensor data 214 undergoes pre-processing before the vibration pattern is identified. For example, various audio signal processing algorithms and/or software (e.g., sensor data processor 262) can be used. In different embodiments, the sensor data 214 can be processed either at the participant device 230 and/or via sensor data processor 262 in order to extract the relevant haptic features, which is then provided to a motion record pattern recognition module 264, which will identify the specific pattern of vibrations in the sensor data 214.

In one embodiment, the system 250 is configured to compare the identified pattern from motion sensor data 214 against the reference response (i.e., the haptic response that should occur when the participant device 230 (and in some cases, a user's hand) experiences the vibration via a response match determination module 270. If the responses match within certain parameters, the user or video is deemed to pass the authentication or verification test, indicating with a high likelihood that the user is indeed the account holder or other authorized person. In some embodiments, the haptic data is processed and models or representations of the haptic pattern are built. These models are compared against one another.

In different embodiments, a scoring occurs via the response match determination module 270. The scoring process is analogous to "what is the probability that the response captured by the motion sensor(s) is the same as the verification reference haptic sample that is stored in the reference response database for each signal?" Thus, in some embodiments, the determination of a "match" is not necessarily based on the verification/reference sample directly or exactly matching the content of the image sample, but rather on the two samples being substantially similar or sharing particular features. The returned score is evaluated against a threshold value to determine if it meets or exceeds the minimum acceptable score by the match determination module 270. If the score is determined to indicate a successful match, the system 250 and/or agent may allow a user to proceed further within a call center or telephone banking menu system or other secured resource 294 being safeguarded by the service provider.

Thus, the data samples are compared by the response match determination module 270, and if a match is found or is in an acceptable range, the access to secured resource(s) 294 by the user will be allowed and/or enabled by access gateway 292. Otherwise, access is denied, or blocked pending further verification. In some embodiments, the system is configured to then automatically generate a message indicating an unauthorized attempt to access the secured resource may have occurred. In some embodiments, this message can be automatically transmitted by the platform to the user's account address or other communication channel on record in user accounts database 282 for the registered user.

It can be appreciated that authentication based on verification of the user's response to a haptic signal at the known user device strongly implies that the user's identity is true and correspondingly is in fact entitled to whatever access is being requested. It should be understood that while the system 250 bases access decisions at least in part on the detection of the appropriate response from the user, the system is in some embodiments further configured to first confirm that the user ID and optional password match based on information available in the user accounts database 296.

Although not shown in FIG. 2, it should be understood that a support agent (human or virtual) can be connected to and interact with customers via a call management or customer support server that can manage the distribution, transfer, and handling of various calls that come into the support center. For example, a customer may be routed via the customer support server to an appropriate agent computing device associated with a particular member service representative (MSR) better suited to respond to the particular caller. In different embodiments, the agent device 210 can be connected to or include an internet customer interface for providing support specifically to customers or members who contact them via the Internet. As a general matter, support agents or service representatives can refer to any person or personnel who offers the caller (or person who was called) assistance, and has access to the system 250 during the communication session with the customer.

Figure 3:
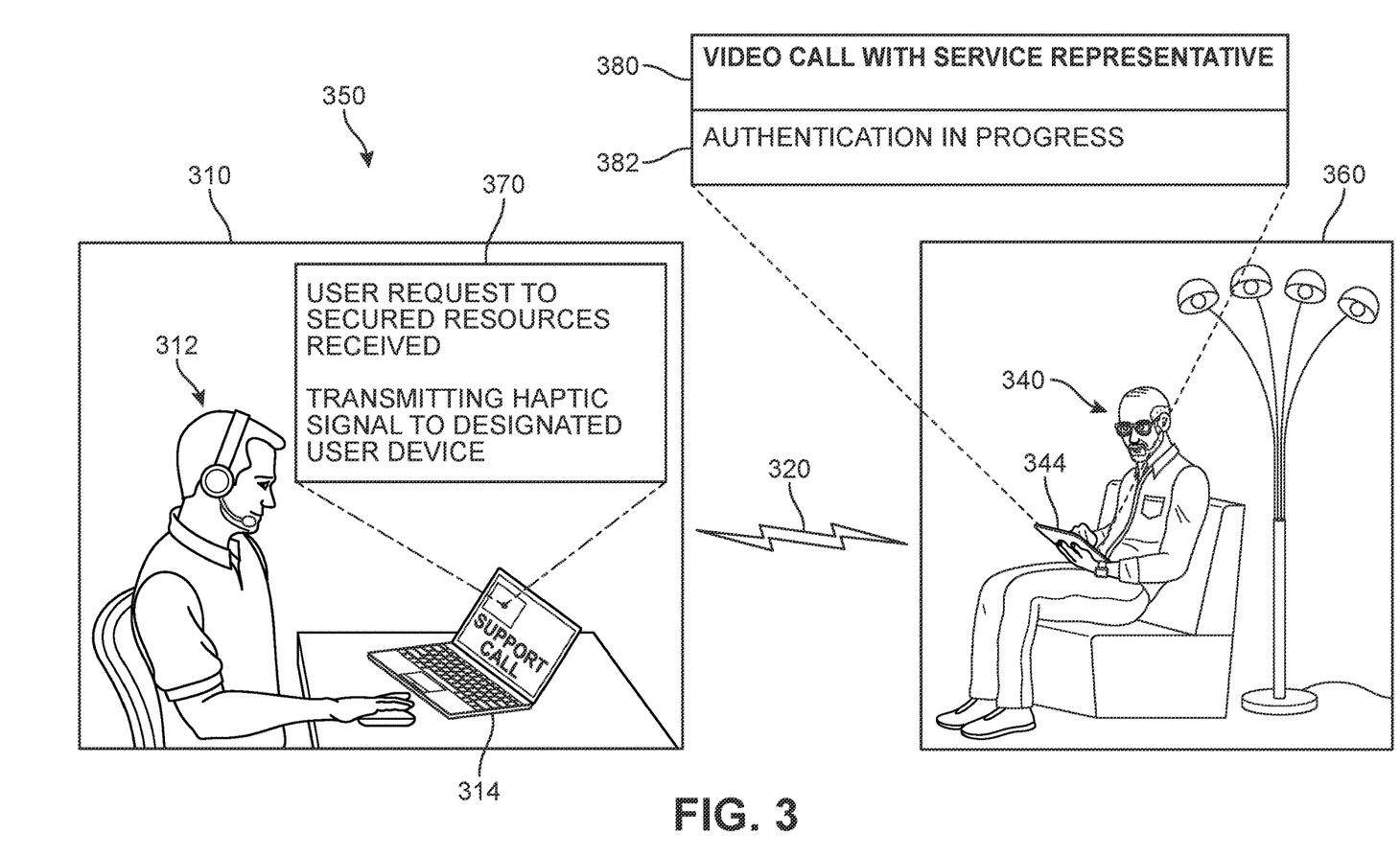
FIG. 3 depicts an example of a user requesting access to a secured resource and the authentication system initiating a remote authentication event, according to an embodiment.

Referring now to FIGS. 3-6, an example of an authentication scenario occurring during a communication session 350 between a second user 340 and an agent 312 is depicted. In FIG. 3, the second user 340 is, via a first computing device ("first device") 344 at a remote location 360, interacting with the access management system app and communicating with an agent 312 over network 320. The agent 312 is communicating with second user 340 via a second computing device ("second device") 314 located at a call center 310 or other space remote relative to the second user 340.

For purposes of this example, the second user 340 has requested access to secured resources associated with a user account managed by the entity which agent 312 is representing. In this case, a first user interface ("first interface") 380 provides a first chat window 382 to allow the second user 340 to partake in an instant messaging session with the second agent 312 ("Video Call with Service Representative/ Authentication In Progress"). In other embodiments, the communication can occur in part or fully via a video conferencing interface whereby the agent 312 and second user 340 speak in real-time over a video screen.

Thus, a user can communicate via an interface generated by an application provided by access management system. The application can offer a user interface that may be accessed via any user computing device configured for connection to a network. In different embodiments, the application can be configured to offer content via native controls presented via an interface. Throughout this application, an "interface" may be understood to refer to a mechanism for communicating content through a client application to an application user. In some examples, interfaces may include pop-up windows that may be presented to a user via native application user interfaces (UIs), controls, actuatable interfaces, interactive buttons or other objects that may be shown to a user through native application UIs, as well as mechanisms that are native to a particular application for presenting associated content with those native controls. In addition, the terms "actuation" or "actuation event" refers to an event (or specific sequence of events) associated with a particular input or use of an application via an interface, which can trigger a change in the display of the application. This can include selections or other user interactions with the application, such as a selection of an option offered via a native control, or a 'click', toggle, voice command, or other input actions (such as a mouse left-button or right-button click, a touchscreen tap, a selection of data, or other input types). Furthermore, a "native control" refers to a mechanism for communicating content through a client application to an application user. For example, native controls may include actuatable or selectable options or "buttons" that may be presented to a user via native application UIs, touch-screen access points, menus items, or other objects that may be shown to a user through native application UIs, segments of a larger interface, as well as mechanisms that are native to a particular application for presenting associated content with those native controls. The term "asset" refers to content that may be presented in association with a native control in a native application. As some non-limiting examples, an asset may include text in an actuatable pop-up window, audio associated with the interactive click of a button or other native application object, video or other media associated with a user interface, or other such information presentation.

Figure 4A:
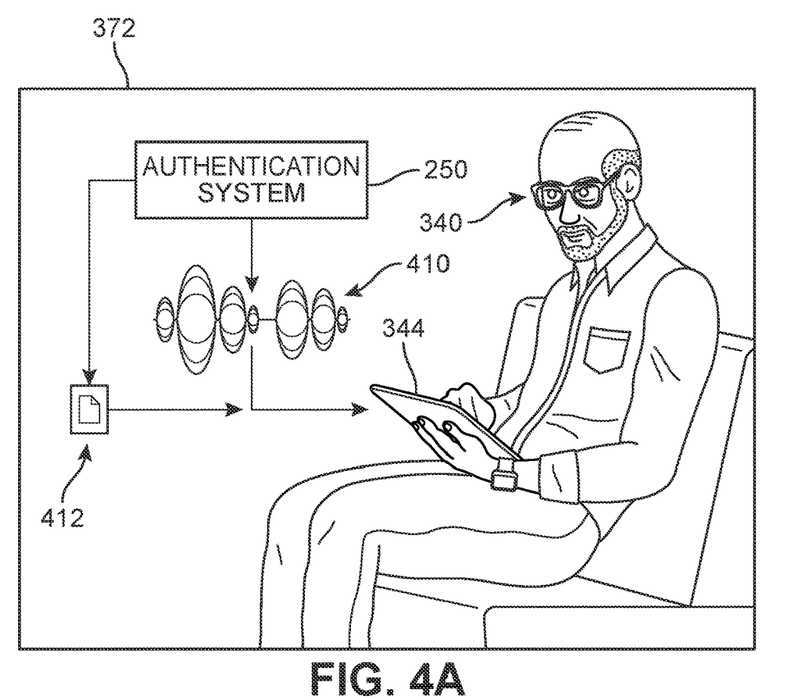
FIGS. 4A and 4B depict an example of haptic control signal causing a vibration at the user's device, and the vibration being recorded by a sensor of the user's device for transmission to the authentication system, according to an embodiment.
Figure 4B:
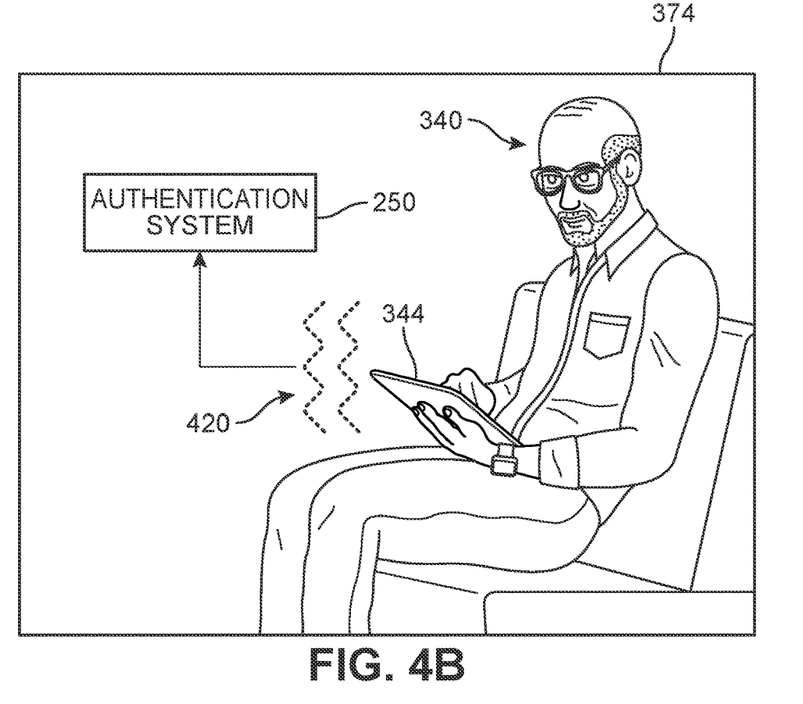

In different embodiments, in response to the user request to access secured resources, a haptic control signal can be automatically generated by the system or initiated by the agent 312, as indicated by a first status message 370. Referring to FIGS. 4A and 4B, at a first time 372, the authentication system 250 transmits haptic control signal 410 to the first device 344. The first device 344 receives the haptic control signal 410, which causes the first device 344 to produce a vibration pattern via one or more vibration motor(s) disposed within the device. The motion sensors and/or image sensors for the first device 344 can be configured to record the output effect of the vibration pattern as haptic output data 420 in response to a second sensor control signal 412. In some embodiments, the sensor capture event is scheduled to occur at a first time. Prior to or substantially synchronous to the transmission of the control signal causing the sensor capturing event at the first device 344, haptic control signal 410 is also transmitted to the first device 344, causing the first device 344 to produce the particular vibration pattern, at a second time that coincides with the first time, as shown in FIG. 4B.

In other words, in FIG. 4A, a first control signal (haptic control signal) 410 is generated and transmitted by the authentication system to the first device 344 directed toward producing a vibration output. At or around the same time, a second control signal (sensor control signal 412) is generated and transmitted by the authentication system to the first device 344 directed toward causing images sensors and/or motion sensors of the first device 344 to capture data during the production of vibration output. While the two control signals are shown as two separate transmissions in FIG. 4A, in other embodiments, a single control signal transmission can include both the two control signals in one transmission. In this example, the haptic output data 420 that has been generated in response to the haptic control signal 410 can include a sequence of vibrations of varying (or same)

intensity. As each vibration occurs, sensors capture the response of first device 344. This data is then sent back to the authentication system 250.

Figure 5:
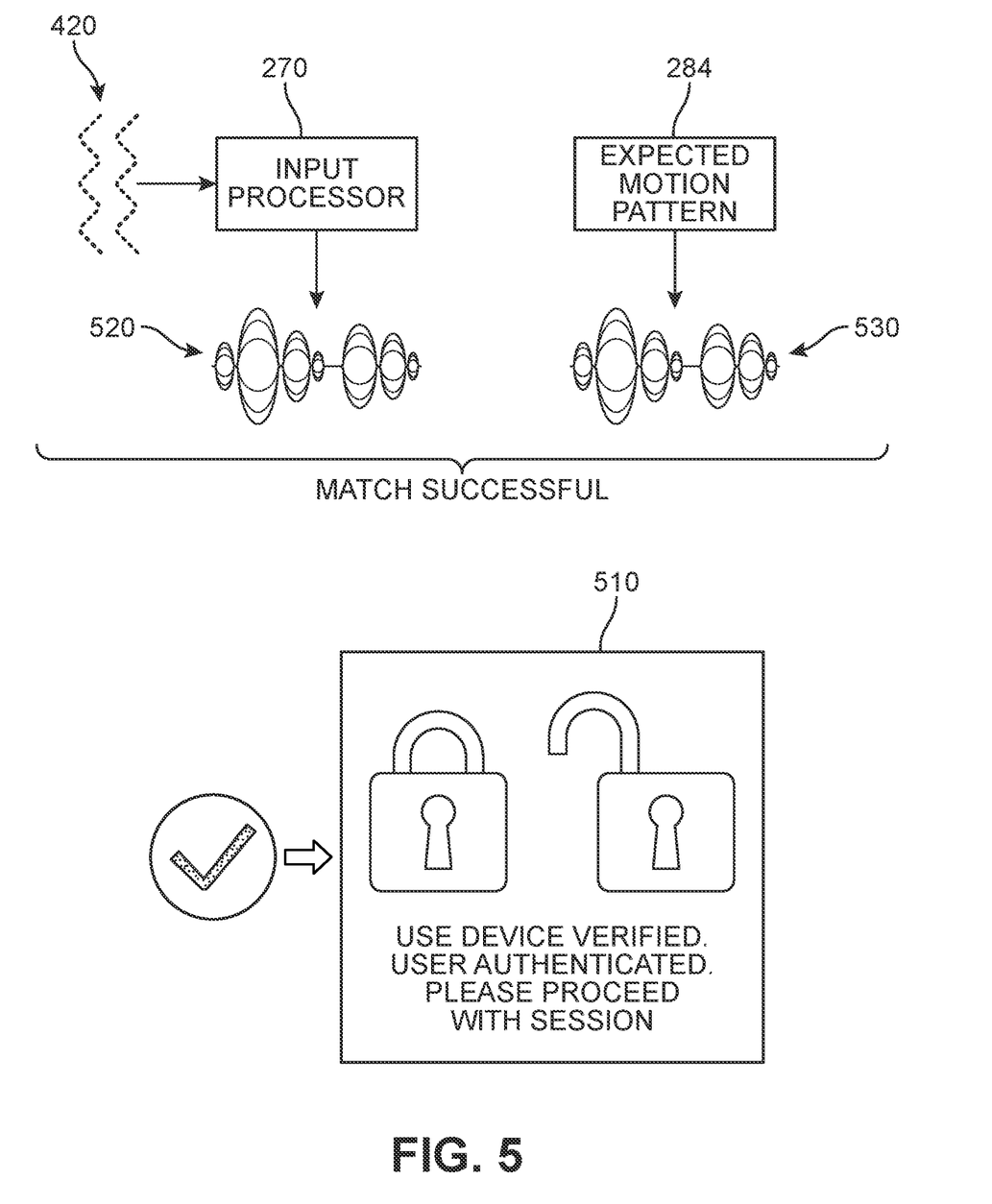
FIG. 5 depicts an example of a system determination that the sensor data includes a motion record that matches the motion expected based on the haptic pattern that was selected, resulting in the system granting access to the secured resource, according to an embodiment.

Referring next to FIG. 5, a depiction of haptic output data 420 as received by the input processor module 270 is shown. The sensor data is processed in order to extract relevant features, where a set of features has been extracted to obtain a device haptic pattern 520. This signal is compared to a reference motion pattern 530 stored in expected motion pattern database 284 to verify that the video being captured by second device 344 during the communication session is authentic. In this case, the patterns have been determined to be similar enough so as to be classified as a match, as indicated by a second status message 510 ("User device verified. User authenticated. Please proceed with session") presented to the agent. The system can then automatically enable or grant the second user access the secured resource, or the agent can respond to the verification by manually enabling access.

Figure 6:
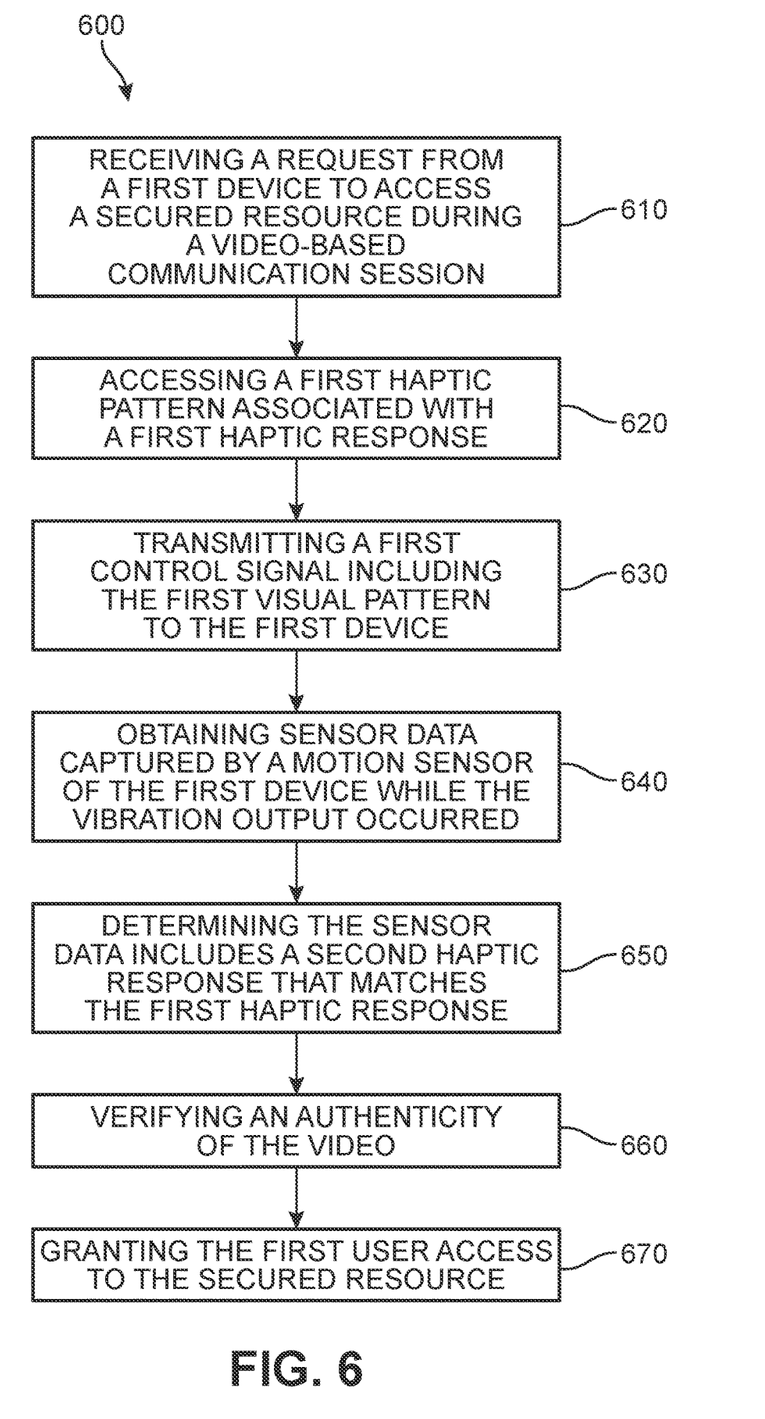
FIG. 6 is a flow chart depicting a process of verifying an authenticity of video in order to protect user resources, according to an embodiment.

FIG. 6 is a flow chart illustrating an embodiment of a method 600 of verifying an authenticity of images in order to protect user resources. The method 700 includes a first step 610 of receiving, at a cloud-based authentication system and from a first computing device, a request to access a secured resource of a first user while video is streaming from the first computing device to the authentication system. The method 600 also includes a second step 620 of accessing, in response to the request, a first haptic pattern from a pattern repository of the authentication system, the first haptic pattern being associated with a first haptic response that should be detected when a computing device generates a vibration output based on the first haptic pattern. A third step 630 includes transmitting, from the authentication system and in response to the request, a first control signal to the first computing device, the first control signal including the first haptic pattern. Furthermore, a fourth step 640 includes obtaining, at the authentication system, first sensor data captured by a motion sensor of the first computing device while the vibration output based on the first haptic pattern via the first computing device was to have occurred, and a fifth step 650 includes determining, at the authentication system, that the first sensor data includes a second haptic response that is sufficiently similar to the first haptic response so as to be classified as a match. In addition, a sixth step 660 includes verifying, in response to responses matching, an authenticity of the video, and a seventh step 670 involves granting the first user access to the secured resource for which the first user is authorized.

In other embodiments, the method may include additional steps or aspects. In some embodiments, the method also includes a step of transmitting, from the authentication system and to the first computing device, a second control signal including instructions to capture sensor data while the vibration output was generated by the first computing device. In some examples, the second haptic pattern represents an output of one or more bursts of vibration generated by a vibration motor of the first computing device. In one case, each of the one or more bursts vary in intensity. In another embodiment, the first sensor data includes a motion record for the first computing device while being held by a hand of the first user. In some embodiments, the first sensor data is collected while a face of the first user is in a field of view of a camera of the first computing device (while video of the user's face is recorded, which is being tested to determine if it is authentic or a deep fake/forgery). In another example, the secured resource includes one of a service, feature, and information for which access is restricted to one or more authorized persons. In one embodiment, the first sensor data is obtained during a telephone or videoconferencing session between the first user and a service representative associated with the secured resource. In some embodiments, the sensor data is obtained from one or more of an accelerometer, gyroscope, and camera.

Other methods may be contemplated within the scope of the present disclosure. For example, in some embodiments, a method of detecting fraudulent attempts to obtain access to secure user data using image data is disclosed. The method includes a first step of receiving, at a cloud-based authentication system and from a first computing device, a request to access a secured resource of a first user while video is streaming from a camera from the first computing device to the authentication system, and a second step of accessing, in response to the request, a first haptic pattern from a pattern repository of the authentication system, the first haptic pattern being associated with a first haptic response that should be detected when a computing device generates a vibration output based on the first haptic pattern. A third step includes transmitting, from the authentication system and in response to the request, a first control signal to the first computing device, the first control signal including the first haptic pattern, and a fourth step includes obtaining, at the authentication system, first sensor data captured by a motion sensor of the first computing device while the vibration output based on the first haptic pattern via the first computing device was to have occurred. A fifth step includes determining, at the authentication system, that the first sensor data fails to include a response that matches the first haptic response, a sixth step includes determining, in response to the first sensor data failing to include a matching pattern, that there is a high likelihood of the request originating from a fraudulent source, and a seventh step includes denying the request and blocking access to the secured resource (in response to the determination that there is a high likelihood of the request originating from a fraudulent source).

In such embodiments, the method may include additional steps or aspects. In some embodiments, the method also includes a step of transmitting, from the authentication system and to the first computing device, a second control signal including instructions to capture sensor data while the vibration output was generated by the first computing device. In some embodiments, the first sensor data includes a motion record for the first computing device while being held by a hand of the first user. In another embodiment, the first sensor data is collected while a face of a person is in a field of view of a camera of the first computing device. In one example, video is at least partially generated using deep fake technology. In some embodiments, the method also includes steps of generating a message indicating an unauthorized attempt to access the secured resource may have occurred, and automatically transmitting the message to a communication channel for the first user (i.e., an email address, SMS, in-app chat, paper letter, pop-up window, etc.).

The processes and methods of the embodiments described in this detailed description and shown in the figures can be implemented using any kind of computing system having one or more central processing units (CPUs) and/or graphics processing units (GPUs). The processes and methods of the embodiments could also be implemented using special purpose circuitry such as an application specific integrated circuit (ASIC). The processes and methods of the embodiments may also be implemented on computing systems including read only memory (ROM) and/or random access memory (RAM), which may be connected to one or more processing units. Examples of computing systems and devices include, but are not limited to: servers, cellular phones, smart phones, tablet computers, notebook computers, e-book readers, laptop or desktop computers, all-in-one computers, as well as various kinds of digital media players.

The processes and methods of the embodiments can be stored as instructions and/or data on non-transitory computer-readable media. The non-transitory computer readable medium may include any suitable computer readable medium, such as a memory, such as RAM, ROM, flash memory, or any other type of memory known in the art. In some embodiments, the non-transitory computer readable medium may include, for example, an electronic storage device, a magnetic storage device, an optical storage device, an electromagnetic storage device, a semiconductor storage device, or any suitable combination of such devices. More specific examples of the non-transitory computer readable medium may include a portable computer diskette, a floppy disk, a hard disk, magnetic disks or tapes, a read-only memory (ROM), a random access memory (RAM), a static random access memory (SRAM), a portable compact disc read-only memory (CD-ROM), an erasable programmable read-only memory (EPROM or Flash memory), electrically erasable programmable read-only memories (EEPROM), a digital versatile disk (DVD and DVD-ROM), a memory stick, other kinds of solid state drives, and any suitable combination of these exemplary media. A non-transitory computer readable medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Instructions stored on the non-transitory computer readable medium for carrying out operations of the present invention may be instruction-set-architecture (ISA) instructions, assembler instructions, machine instructions, machine dependent instructions, microcode, firmware instructions, configuration data for integrated circuitry, state-setting data, or source code or object code written in any of one or more programming languages, including an object oriented programming language such as Smalltalk, C++, or suitable language, and procedural programming languages, such as the "C" programming language or similar programming languages.

Aspects of the present disclosure are described in association with figures illustrating flowcharts and/or block diagrams of methods, apparatus (systems), and computing products. It will be understood that each block of the flowcharts and/or block diagrams can be implemented by computer readable instructions. The flowcharts and block diagrams in the figures illustrate the architecture, functionality, and operation of possible implementations of various disclosed embodiments. Accordingly, each block in the flowchart or block diagrams may represent a module, segment, or portion of instructions. In some implementations, the functions set forth in the figures and claims may occur in an alternative order than listed and/or illustrated.

The embodiments may utilize any kind of network for communication between separate computing systems. A network can comprise any combination of local area networks (LANs) and/or wide area networks (WANs), using both wired and wireless communication systems. A network may use various known communications technologies and/or protocols. Communication technologies can include, but are not limited to: Ethernet, 802.11, worldwide interoperability for microwave access (WiMAX), mobile broadband (such as CDMA, and LTE), digital subscriber line (DSL), cable internet access, satellite broadband, wireless ISP, fiber optic internet, as well as other wired and wireless technologies. Networking protocols used on a network may include transmission control protocol/Internet protocol (TCP/IP), multiprotocol label switching (MPLS), User Datagram Protocol (UDP), hypertext transport protocol (HTTP), hypertext transport protocol secure (HTTPS) and file transfer protocol (FTP) as well as other protocols.

Data exchanged over a network may be represented using technologies and/or formats including hypertext markup language (HTML), extensible markup language (XML), Atom, JavaScript Object Notation (JSON), YAML, as well as other data exchange formats. In addition, information transferred over a network can be encrypted using conventional encryption technologies such as secure sockets layer (SSL), transport layer security (TLS), and Internet Protocol security (Ipsec).

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A computer-implemented method of verifying an authenticity of video in order to protect user resources, the method comprising:
   receiving, at a cloud-based authentication system and from a first computing device, a request to access a secured resource of a first user while video is streaming from the first computing device to the authentication system;
   accessing, in response to the request, a first haptic pattern from a pattern repository of the authentication system, the first haptic pattern being associated with a first haptic response that should be detected when a computing device generates a vibration output based on the first haptic pattern;
   transmitting, from the authentication system and in response to the request, a first control signal to the first computing device, the first control signal including the first haptic pattern;
   obtaining, at the authentication system, first sensor data captured by a motion sensor of the first computing device while the vibration output based on the first haptic pattern via the first computing device was to have occurred, wherein the first sensor data is not dependent on any active interaction of the first user with the authentication system;
   determining, at the authentication system, that the first sensor data includes a second haptic response that is sufficiently similar to the first haptic response so as to be classified as a match;
   verifying, in response to the responses matching, an authenticity of the video; and
   thereby granting the first user access to the secured resource for which the first user is authorized.

2. The method of claim 1, further comprising transmitting, from the authentication system and to the first computing device, a second control signal including instructions to capture sensor data while the vibration output was generated by the first computing device.

3. The method of claim 1, wherein the second haptic pattern represents an output of one or more bursts of vibration generated by a vibration motor of the first computing device.

4. The method of claim 3, wherein each of the one or more bursts vary in intensity.

5. The method of claim 1, wherein the first sensor data includes a motion record for the first computing device while being held by a hand of the first user.

6. The method of claim 1, wherein the first sensor data is collected while a face of the first user is in a field of view of a camera of the first computing device.

7. The method of claim 1, wherein the secured resource includes one of a service, feature, and information for which access is restricted to one or more authorized persons.

8. The method of claim 1, wherein the first sensor data is obtained during a telephone or videoconferencing session between the first user and a service representative associated with the secured resource.

9. The method of claim 1, wherein the sensor data is obtained from one or more of an accelerometer, gyroscope, and camera.

10. A computer-implemented method of detecting fraudulent attempts to obtain access to secure user data using image data, the method comprising:
receiving, at a cloud-based authentication system and from a first computing device, a request to access a secured resource of a first user while video is streaming from a camera of the first computing device to the authentication system;
accessing, in response to the request, a first haptic pattern from a pattern repository of the authentication system, the first haptic pattern being associated with a first haptic response that should be detected when a computing device generates a vibration output based on the first haptic pattern;
transmitting, from the authentication system and in response to the request, a first control signal to the first computing device, the first control signal including the first haptic pattern;
obtaining, at the authentication system, first sensor data captured by a motion sensor of the first computing device while the vibration output based on the first haptic pattern via the first computing device was to have occurred, wherein the first sensor data is not dependent on any active interaction of the first user with the authentication system;
determining, at the authentication system, that the first sensor data fails to include a response that matches the first haptic response;
determining, in response to the first sensor data failing to include a matching pattern, that there is a high likelihood of the request originating from a fraudulent source; and
denying the request and blocking access to the secured resource.

11. The method of claim 10, further comprising transmitting, from the authentication system and to the first computing device, a second control signal including instructions to capture sensor data while the vibration output was generated by the first computing device.

12. The method of claim 10, wherein the first sensor data includes a motion record for the first computing device while being held by a hand of the first user.

13. The method of claim 10, wherein the first sensor data is collected while a face of a person is in a field of view of a camera of the first computing device.

14. The method of claim 10, wherein the video is at least partially generated using deep fake technology.

15. The method of claim 10, further comprising:
generating a message indicating an unauthorized attempt to access the secured resource may have occurred; and
automatically transmitting the message to a communication channel for the first user.

16. A system for verifying an authenticity of images in order to protect user resources, the system comprising a processor and machine-readable media including instructions which, when executed by the processor, cause the processor to:
receive, at a cloud-based authentication system and from a first computing device, a request to access a secured resource of a first user while video is streaming from the first computing device to the authentication system;
access, in response to the request, a first haptic pattern from a pattern repository of the authentication system, the first haptic pattern being associated with a first haptic response that should be detected when a computing device generates a vibration output based on the first haptic pattern;
transmit, from the authentication system and in response to the request, a first control signal to the first computing device, the first control signal including the first haptic pattern;
obtain, at the authentication system, first sensor data captured by a motion sensor of the first computing device while the vibration output based on the first haptic pattern via the first computing device was to have occurred, wherein the first sensor data is not dependent on any active interaction of the first user with the authentication system;
determine, at the authentication system, that the first sensor data includes a second haptic response that is sufficiently similar to the first haptic response so as to be classified as a match;
verify, in response to the responses matching, an authenticity of the video; and
thereby grant the first user access to the secured resource for which the first user is authorized.

17. The system of claim 16, wherein the instructions further cause the processor to transmit, from the authentication system and to the first computing device, a second control signal including instructions to capture sensor data while the vibration output was generated by the first computing device.

18. The system of claim 16, wherein the second haptic pattern represents an output of one or more bursts of vibration generated by a vibration motor of the first computing device.

19. The system of claim 16, wherein the first sensor data includes a motion record for the first computing device while being held by a hand of the first user.

20. The system of claim 16, wherein the first sensor data is obtained during a telephone or videoconferencing session between the first user and a service representative associated with the secured resource.

* * * * *